(12) United States Patent
Carlsson et al.

(10) Patent No.: US 12,527,918 B2
(45) Date of Patent: Jan. 20, 2026

(54) ACTIVATION SYSTEM FOR A SUPPLEMENTAL DEVICE ATTACHED TO A MEDICAMENT DELIVERY DEVICE

(71) Applicant: SHL MEDICAL AG, Zug (CH)

(72) Inventors: Daniel Carlsson, Enskede (SE); Daniel Säll, Segeltorp (SE)

(73) Assignee: SHL Medical AG, Zug (CH)

( * ) Notice: Subject to any disclaimer, the term of this patent is extended or adjusted under 35 U.S.C. 154(b) by 744 days.

(21) Appl. No.: 17/796,096

(22) PCT Filed: Dec. 10, 2020

(86) PCT No.: PCT/EP2020/085607
§ 371 (c)(1),
(2) Date: Jul. 28, 2022

(87) PCT Pub. No.: WO2021/155981
PCT Pub. Date: Aug. 12, 2021

(65) Prior Publication Data
US 2023/0099408 A1     Mar. 30, 2023

(30) Foreign Application Priority Data

Feb. 7, 2020   (EP) ................................... 20155998

(51) Int. Cl.
*A61M 5/315*   (2006.01)
*A61M 5/20*    (2006.01)
(Continued)

(52) U.S. Cl.
CPC ...... *A61M 5/31568* (2013.01); *A61M 5/3204* (2013.01); *G16H 20/17* (2018.01);
(Continued)

(58) Field of Classification Search
CPC ................ A61M 5/3202; A61M 5/178; A61M 2205/3576; A61M 2205/8206;
(Continued)

(56) References Cited

U.S. PATENT DOCUMENTS 6,270,916 B1   8/2001   Sink
6,277,098 B1   8/2001   Klitmose et al.
(Continued)

FOREIGN PATENT DOCUMENTS

CN   101912641 A   12/2010
CN   108283755 A   7/2018
(Continued)

OTHER PUBLICATIONS

WO-2018237225-A1 (Year: 2018).*
International Search Report and Written Opinion for Int. App. No. PCT/EP2020/085607, mailed Jan. 27, 2021.

*Primary Examiner* — Cris L. Rodriguez
(74) *Attorney, Agent, or Firm* — McDonnell Boehnen Hulbert & Berghoff LLP (57) ABSTRACT

The present disclosure relates to an activation system for a supplemental device that is attached to an existing design of a medicament delivery device, where the removal of a protective cap or other covering from the medicament delivery device pulls a blocking element from between electrical contacts to close a circuit between a battery module and a power source, thus activating the battery module. The supplemental device can further have a transmitter for communicating information about the use of the medicament delivery device to an external device, such as a smart device. Memory storage elements can also be included having unique identification data. The present disclosure also relates to a medicament delivery device having attached the supplemental device.

19 Claims, 6 Drawing Sheets

(51) Int. Cl.
*A61M 5/32* (2006.01)
*G16H 20/17* (2018.01)

(52) U.S. Cl.
CPC ............... *A61M 2005/2006* (2013.01); *A61M 2205/3576* (2013.01); *A61M 2205/52* (2013.01); *A61M 2205/8206* (2013.01)

(58) Field of Classification Search
CPC ...... A61M 2205/3561; A61M 5/31568; A61M 5/3204; A61M 2005/2006; A61M 2205/52
See application file for complete search history.

(56) References Cited

U.S. PATENT DOCUMENTS

| | | | |
|---|---|---|---|
| 7,133,329 | B2 | 11/2006 | Skyggebjerg et al. |
| 8,469,922 | B2 | 6/2013 | Langley et al. |
| 9,656,024 | B2 | 5/2017 | Eggert et al. |
| 10,391,247 | B2 | 8/2019 | Bauss et al. |
| 10,668,224 | B2* | 6/2020 | Gylleby ............... A61M 5/3158 |
| 10,722,654 | B2* | 7/2020 | Cowe .................. A61M 5/31511 |
| 2010/0211005 | A1 | 8/2010 | Edwards et al. |
| 2011/0184343 | A1 | 7/2011 | Veit et al. |
| 2015/0005713 | A1* | 1/2015 | Baran ....................... F16B 2/02 604/189 |
| 2015/0290396 | A1* | 10/2015 | Nagar .................... G16H 20/13 340/540 |
| 2016/0235915 | A1* | 8/2016 | Cabiri ................. A61M 5/3287 |
| 2017/0151390 | A1* | 6/2017 | Muller-Pathle ........ G16H 30/40 |
| 2017/0274149 | A1* | 9/2017 | Aeschlimann ........... H04Q 9/00 |
| 2017/0312446 | A1* | 11/2017 | Kunz ................. A61M 5/31525 |
| 2018/0161513 | A1* | 6/2018 | Richards ............. A61M 5/3202 |
| 2018/0236185 | A1 | 8/2018 | Säll et al. |
| 2018/0280624 | A1* | 10/2018 | Bitton ................. A61M 5/3155 |
| 2018/0318526 | A1* | 11/2018 | Yang .................. A61M 5/3204 |
| 2018/0361067 | A1* | 12/2018 | Säll ........ A61M 5/3257 |
| 2019/0022320 | A1* | 1/2019 | Carlsson ............ A61M 5/2033 |
| 2020/0038593 | A1* | 2/2020 | Keller .................. A61B 5/0531 |
| 2025/0235616 | A1* | 7/2025 | Säll ........................ A61M 5/24 |

FOREIGN PATENT DOCUMENTS

| | | | | |
|---|---|---|---|---|
| EP | 1349592 B1 | 5/2005 | | |
| WO | 97/33638 A1 | 9/1997 | | |
| WO | 02/051477 A1 | 7/2002 | | |
| WO | WO2004/084116 A1 | 9/2004 | | |
| WO | WO-2014064691 A2 * | 5/2014 | ........ A61M 5/31535 |
| WO | 2016/064687 A1 | 4/2016 | | |
| WO | WO-2016055351 A1 * | 4/2016 | ........... A61M 15/00 |
| WO | 2016/154427 A2 | 9/2016 | | |
| WO | 2017084842 A1 | 5/2017 | | |
| WO | 2017/100501 A1 | 6/2017 | | |
| WO | 2017/141194 A1 | 8/2017 | | |
| WO | 2018/237225 A1 | 12/2018 | | |
| WO | 2019170285 A1 | 9/2019 | | |

\* cited by examiner

ACTIVATION SYSTEM FOR A SUPPLEMENTAL DEVICE ATTACHED TO A MEDICAMENT DELIVERY DEVICE

CROSS REFERENCE TO RELATED APPLICATIONS

The present application is a U.S. National Phase Application pursuant to 35 U.S.C. § 371 of International Application No. PCT/EP2020/085607 filed Dec. 10, 2020, which claims priority to European Patent Application No. 20155998.6 filed Feb. 7, 2020.

TECHNICAL FIELD

The present disclosure relates to a supplemental device that attaches to a medicament delivery device, where the supplemental device can function as an information provider that is capable of transmitting unique information concerning the medicament delivery device. The supplemental device is activated by the removal of a covering from the medicament delivery device. The supplemental device can monitor the use of the medicament delivery device and can communicate with external smart devices.

BACKGROUND

Medicament delivery devices, especially those designed for medicament delivery by self-administration, have been on the market for a number of years. In order for the devices to be handled by non-professionals, they have to be easy to use and intuitive. Further, since many of the medicaments are vital or at least very important to the patient there is a desire from physicians and other professionals to obtain information that the patients medicate according to prescribed schemes. The desired information could include the type of medicament, delivery times, dates, dose size, safety information, such as sterility. Also, of importance is whether the medicament or the device itself is counterfeit or has been tampered with. Likewise, information that could be beneficial to the physician concerns whether the medicament has been taken using the correct procedure and following instructions for use; that the medicament has been maintained at the prescribed temperature before and during medicament delivery; that the right injection depth has been used and that the correct injection speed has been used, when the medicament delivery device is an injector.

Systems for obtaining information from a medicament delivery device are known. For example, WO 2004/084116 discloses a system for presenting and distributing medication information, where a medicament delivery device is arranged with communication mechanisms which will enable communication with an external device such as a cellular or a mobile phone or a personal digital assistant (PDA). A preferred communication standard is Bluetooth. The medicament delivery device is arranged with a number of sensors for monitoring and registering e.g. a dose delivery sequence. The idea is then to use the functionality of the external device, such as its display, its processor, its keyboard, etc. instead of providing the medicament delivery device with such features. The transfer of the functionality to the external device will reduce the cost of the medicament delivery device in comparison with medicament delivery devices provided with such functionality.

However, a drawback with the solution according to WO 2004/084116 is that a Bluetooth circuit, or the like wireless communication systems such as ANT or ZigBee, is built into the housing of the medicament delivery device. The communication system with its battery to power the circuit requires a dedicated space in a medicament delivery device. Manipulation of existing device designs to accommodate an add-on battery module may trigger unforeseen regulatory problems. Another issue with known data collection devices is that the power source is directly connected to the electronic circuit at the time the battery module is manufactured and attached to the medicament delivery device. This can cause premature battery drain. Additionally, such systems require the user to perform a separate and specific step of activating the battery module, which may not always be performed successfully.

It is thus not so easy to modify existing designs or to easily provide existing designs with added functionality that communication systems can provide. As such, there is a need to provide an activation system that is automatic and is performed as part of the normal use of the medicament delivery device.

SUMMARY

The aim of the present disclosure is to provide an activation mechanism for a supplemental device that is attachable to an existing medicament delivery device, where the attachment does not require that the existing design of the medicament delivery device be modified or otherwise changed. A particularly preferred supplemental device is an information provider device that can be used on and with a number of different medicament delivery devices, and in particular configured for use on medicament delivery devices for self-administration of medicaments. Preferably the medicament delivery devices arranged with such information providers could be used with conventional external smart devices common on the market and used by the majority of patients that handle medicament delivery devices for self-administration.

In the present disclosure, when the term "distal direction" is used, this refers to the direction pointing away from the dose delivery site during use of the medicament delivery device. When the term "distal part/end" is used, this refers to the part/end of the delivery device, or the parts/ends of the members thereof, which under use of the medicament delivery device is/are located furthest away from the dose delivery site. Correspondingly, when the term "proximal direction" is used, this refers to the direction pointing towards the dose delivery site during use of the medicament delivery device. When the term "proximal part/end" is used, this refers to the part/end of the medicament delivery device, or the parts/ends of the members thereof, which under use of the medicament delivery device is/are located closest to the dose delivery site.

Further, the terms "longitudinal", "longitudinally", "axially" and "axial" refer to a direction extending from the proximal end to the distal end and along the device or components thereof, typically in the direction of the longest extension of the device and/or component.

Similarly, the terms "transverse", "transversal" and "transversally" refer to a direction generally perpendicular to the longitudinal direction.

As used herein, the term "medicament" is meant to encompass any medicament-containing flowable medicine capable of being passed through a delivery means such as a cannula or hollow needle in a controlled manner, such as a liquid, solution, gel or fine suspension. Representative medicaments include pharmaceuticals such as peptides, proteins, and hormones, biologically derived or active agents, hormonal and gene-based agents, nutritional formulas and other substances in both solid (dispensed) or liquid form. In the description of the exemplary embodiments reference will be made to the use of insulin. Correspondingly, the term "subcutaneous" infusion or injection is meant to encompass any method of transcutaneous delivery to a subject.

In the present disclosure the term "module" is meant to encompass a self-contained unit or item, such as an electronic component or an assembly of electronic components and associated wiring, which itself performs a defined task and can be linked with other such unit to form a larger system.

According to a main aspect of the disclosure, the supplemental device is powered by a battery that is initially in a disconnected state such that no power is supplied to or from the supplemental device. Stated differently, the supplemental device can be attached to the medicament delivery device prior to use the of the device, for example, during manufacturing or assembly, in a non-energized state where a battery is temporarily electrically isolated from electrical connection with the other components of the supplemental device. The battery is maintained in the isolated or disconnected state through the use of a mechanically opened normally closed switch or the use of a sheet, ribbon or strip of insulation material that is positioned between two electrical contacts. Holding the normally closed switch open can be achieved through a removable mechanical intervention applied to the switch, such as, a switch block that holds the normally closed switch in an open position. Removal of the mechanical intervention will cause the switch to close thus connecting the battery into the circuit. Likewise, the removal the insulating material will cause electrical contacts to close or otherwise come together to form an electrical connection such that electricity from the battery will flow through and between the contacts, thus closing or energizing the electrical circuit connected to the other electrical components. The removal of the mechanical intervention or removal of the insulting material, collectively referred to hereinafter as a "blocking element", from between the electrical contacts is analogous to the closing of a conventional line switch.

The physical removal of the blocking element from the supplemental device is preferably accomplished as part of a required step of using the medicament delivery device. For example, in the case of a medicament delivery device, the removal of a protective cap or other covering of a dose delivery outlet member is usually required prior to the use of the medicament delivery device. Incorporation of the blocking element removal procedure with the removal of the cap is a preferred mechanism because this eliminates the need for the user of the device to perform a separate step or procedure. This simultaneous removal of the cap or covering from the medicament delivery device and the activation of the supplemental device can be accomplished by connecting the blocking element to the cap or other covering located on the medicament delivery device. A firm and strong connection of the blocking element with the cap will ensure that the blocking element is fully removed from between the electrical contacts as the user removes and discards the cap from the medicament delivery device.

Removal of the protective cap from the proximal end of the housing of the medicament delivery device be accomplished by a pure linear or axial motion of the cap relative to housing or through a pure rotation of the cap or a combination of both rotation and axial motions. Regardless of the manner in which the cap is separated from the proximal end of the housing the activation mechanism of the present disclosure is configured so that the blocking element that is attached to the cap will remain securely attached to the cap during cap removal. This will ensure that the blocking element will be completely removed from between the contacts and thus result in closing the electrical circuit so that the supplemental device is energized by and receives power from the battery.

One possible embodiment of the present disclosure is directed to a system for activating a supplemental device attached to a medicament delivery device, where the medicament delivery device includes a housing having a proximal end, a medicament container positioned within the housing, and a dose delivery outlet accessible through a terminal end of the proximal end. A removable cap is attached to the proximal end of the housing such that the dose delivery outlet is not accessible unless the cap is fully removed from the device. The supplemental device comprises a battery module that is attached to the housing, preferably to the proximal end of the housing, or to the cap. The battery module can include a battery, a contact pad, and a switch operatively connected to the battery and the contact pad, where a part of the switch is directly connected to the removable cap when the battery module is attached to the housing or where a part of the switch is directly connected to the housing when the battery module is attached to the cap. Additionally, the supplemental device further comprises a communication module connectable to the battery module or included as part of the battery module, and configured to transmit data to an external device. A recorder can be included as part of the battery module or as part of the communication module and the recorder is configured to obtain and store information about the medicament delivery device. The switch preferably is initially in a first state where the recorder is prevented to/does not receive power from the battery and where movement of the cap proximally relative to the housing changes the switch to a second state where the battery provides power to the recorder and/or the communication module.

The switch can be configured such that it can be in the first state only once. This is best accomplished by configuring the switch such that it prevented to/cannot transform from the second state back to the first state. One possible configuration that will prevent such a transformation involves the use of normally closed switch that is physically held in a temporary open position or through the use of a sheet, ribbon, or strip of material operatively connected between the battery and the contact pad. A preferred sheet material is made from an insulating material such that the sheet prevents electricity conduction i.e. cannot conduct electricity. The sheet can be sized to be in the form of a strip of insulating material that fits within or between two electrical contacts such that the contacts do not touch each other, thus maintaining the electrical circuit in an open state, i.e., the battery being isolated from and not connected to the other electrical components making up the supplemental device.

In some cases where a normally closed mechanical switch is used, the strip of material can be a rigid rod or shaft that mechanically fits within the switch mechanically holding a part of the switch in an open position such that circuit is open. This rigid rod or shaft can be directly connected, or it can an integral part of the protective cap (e.g., co-molded with the cap). The rod or shaft could extend distally away from the protective cap and be configured to fit into the supplemental device. When the cap is pulled away from the medicament delivery device housing that it is attached to, as well as away from the supplemental device that is attached to the housing, the shaft will also be pulled out of the switch wherein the normally closed switch will then close, thus completing (closing) the electrical circuit with the battery.

One end of the insulating material which forms part of the switch can be directly connected to the cap, where the connection can be to an outside or inside surface of the cap. One method of attachment is through the use of an adhesive, however, a snap fit or sonic welding could also be used. The other end of the insulating material is preferably formed as a free end or tail that can be easily and smoothly pulled out from between the contacts. In some instances, it may be necessary to use one or more biasing components that exert an axial force on the contacts such that the contacts are biased toward each other. This biasing force ensures that the insulating sheet material remains between the contacts, for example, during device assembly, shipping and general pre-use handling. The biasing component can exert a force only on the contact pad such that it is biased towards a contact surface operatively associated with the battery. Likewise, the biasing component can bias one of the contact pads and the battery in a direction toward one of the contact pads and the battery. Alternatively, the biasing component biases only the battery itself or a battery holder towards the contact pad. The free end or tail of the insulating material is preferably positioned between the electrical contacts during the manufacturing and assembly of the supplemental device and before the supplemental device is attached to a medicament delivery device. In this manner battery life can be protected well before the supplemental device is eventually connected to a medicament delivery device. It is contemplated that the supplemental device of this disclosure can be provided by itself, i.e., it need not be provided with an assembly including a medicament delivery device and a cover portion or cap. In other words, it can be provided as a standalone unit. However, in such a case, one end of the insulating must be attached to the cap or other covering prior to the use of the medicament delivery device.

The activation system of the present disclosure is formed when two steps are completed. One step involves the attachment of the supplemental device to the housing or to the cap of the medicament delivery device and the other step is the attachment of a part of the switch, i.e., the blocking element, to the protective cap or other covering that must be removed before the medicament delivery device is ultimately used for its intended design purpose or to the housing if the supplemental device is attached to the cap. The attachment of the supplement device can be to any location on the housing of the medicament delivery device. Further, the attachment can be permanent such that the housing or the cap, and the battery module are disposable i.e. not reusable and are prevented to i.e. cannot be separated from each other without destroying the housing or the battery module, similarly without destroying the cap or the battery module. Alternatively, the attachment of the supplemental device can be configured such that the supplemental device can be removed after activation, but before the end of useful life of the medicament delivery device. In such a circumstance the supplemental device may be configured for disposal or for reuse with another or the same medicament delivery device. In this latter case, the supplement device may be configured with a separate second switch component so the when removed from the medicament delivery device the user can "turn off" (disconnect the battery) to prolong battery life. If the supplemental device is reused with another or the same medicament delivery device, the user can "turn on" the second switch to again to close the circuit between the battery and the other electrical components in the supplemental device, thus energizing the components within the supplemental device.

When the switch of the present disclosure is used with an existing injection device, such as an auto-injector, that has a protective cap that surrounds and encloses a separate needle cover or shield, it is desirable that the use of the blocking element does not require the user to exert any significant additional force other than is normally required to remove the protective cap and needle cover assembly, which are typically configured such that axial or rotational movement of the protective cap causes simultaneous removal of the needle cover. One solution is to have the cap and needle cover assembly be completely removed before the blocking element is removed. This can be achieved by using a long tether that is extended from a coiled, wrapped or otherwise stored position as the cap/needle cover is removed and once the cap/needle cover assembly is freed from the injector then the further movement of the cap/needle cover assembly will cause the blocking element to reach the limit of the tether such that it pulls and removes the blocking element from the battery module located on the injector housing. The tether can be coiled or wrapped and stored inside the battery module to avoid having a long tether exposed that can get tangled such that it is accidentally pulled and removed from the battery module prematurely.

In another embodiment, the supplemental device may comprise two or more modules, either integrated or separated and attachable to each other. For example, a first battery module can be configured to be permanently attached, i.e., non-releasably coupled, to the housing or to the cap of the medicament delivery device. An adhesive, welding, one-way snap fit are ways to achieve this permanent attachment. A component module such as the communication module, a sensor module, a log module, etc., wherein each component module may contain other electrical components, such as the recorder, etc. In one example, the component module may be configured to be removably attached to the battery module such that it can then be reused and attached to another battery module. In such a case, the first battery module is disposed of with the housing or the cap of the first medicament delivery device and the removed component module is then attached to a second battery module containing a fresh or new battery. A new insulating sheet may be inserted between the second battery module and the previously used component module. This can occur prior to or after the second battery module is attached to a second medicament delivery device housing or cap. One end of the insulating material would then be fixed to a protective cap or other covering attached to the housing of a second medicament delivery device.

Positioning of the supplemental device, or just a battery module, on the housing or cap can be performed by the manufacturer of the medicament delivery device, by a healthcare provider or by a user of the device. The shape of the supplemental device preferably matches or conforms to the shape of the housing of the medicament delivery device where it is attached. In the case of a pen type injection device, the shape of the supplement device could be conical or have a substantially conical shaped portion adapted to be axially and/or slidably attached to the medicament delivery device such that when the battery module is mounted it is axially and rotational locked.

The transfer of information from the supplemental device is prevented to/cannot occur until the supplemental device has been activated by connecting the battery to the electrical circuit containing the other electrical components. Once activated, the transfer of information to the supplemental device concerning the state of the medicament delivery device may be by galvanic or non-galvanic means, e.g. audible, optical, vibration or electromagnetic.

The medicament expelling mechanism may be mechanical or substantially mechanical, i.e., electro-mechanical, it can also include some electronic components. The supplemental device may comprise means for transferring data to an external device, e.g. by wireless IR or RF means but not limited to those.

The supplemental device may further comprise a sensor e.g. a sound sensor that can detect, for example, a rotational sound of the dose setting mechanism, e.g. such as a dose drum. A processing unit can also be arranged for processing the output signal from an optical sensor or other sensors contained in the supplemental device. The sound sensor can be adapted to activate the processing unit when the dosage setting starts manually by rotation a knob. It might also comprise a memory (e.g. RAM random access memory or another kind of memory), integrated into the processing unit or as a separate unit. The memory unit is arranged for receiving and recording the data from the one or more sensors located in the supplemental device. The sound sensor detects the sound of the dosage setting mechanism movement or e.g. a rotational sound of the dose setting drum might be chosen from one of a microphone, an accelerometer and a vibration sensor.

The supplemental device further may comprise a communication module for communicating and transmitting the dosage data to an external device, where the external device can be one of a mobile device such as a mobile or cell phone, a computer and a remote server such as a cloud for recording, storage and monitoring of the injection or inhalation medicament delivery data such as a dosage, time of delivery, date, frequency, medicament, etc. A memory unit can also be located in the supplemental device. The supplemental device might further comprise a resetting button which enables a manual reset of the supplemental device. Such a reset feature is beneficial if the supplemental device or part of the supplemental device is to be reused, for example, on another medicament delivery device.

According to another aspect of the present disclosure, there is presented a method of collecting and recording medicament delivery data, for example, dosage information, time of delivery, frequency, medicament, date, etc. from a medicament delivery device. The medicament delivery device can be a pen-type injector, an auto-injector or an inhaler that has a dosage setting mechanism with a dose indicator, e.g. such as a dose setting drum or the like. If the dose indicator has dosage value indications on its surface and/or a dosage displaying window or opening on the medicament delivery device circumference surface for displaying the dosage values, then the method could include steps of detecting a sound from a dose indicator movement, e.g. a rotational sound from the dose setting drum or other kind of the setting mechanism by a sound sensor and activating a processing unit by the sound sensor.

As stated, the supplemental device may contain a battery module and a communication module, which either one of those modules comprises one or more sensors configured to detect a motion of at least one of the components of the medicament delivery device. It is also feasible that the supplemental device comprises a sensor module connectable to any other module and which comprises one or more sensors configured to detect a motion of at least one of the components of the medicament delivery device. The sensor module may also be included as part of any other module e.g. the battery module, the communication module. Likewise, the supplemental device may further comprise a logging module connectable to any other module or included as part of any other module e.g. the battery module, the communication module, or the sensor module. The logging module is configured to track user behavior of the medicament delivery device, which user behavior is based on a motion detected by the one or more sensors. By tracking the motion of the medicament delivery device, tracking of user behavior for study, training or compliance is improved, which facilitates medicament delivery.

As used in this disclosure, the one or more sensors may generally refer to any kind of sensor capable of detecting movement. Preferably, the one or more sensors may be one or more of the following sensors: a magnetometer, a gyroscope, and/or an accelerometer, wherein high precision tracking of motion is improved.

The system further comprises a memory module connectable to any other module or included as part of any other module. The memory module is configured to store the data and the communication module is configured to transmit the data wirelessly to the external device. Preferably, the memory module is configured to store data from the logging module, wherein tracking is facilitated for a user thereof. The memory module may comprise a non-volatile memory. According to one embodiment, the communication module may be configured to wirelessly or wired transmit data from the recorder, logging module, or memory module and is capable of real time visualization of the tracking is achieved. The battery module is energized when the cap or other covering on the medicament delivery device that is attached to a proximal end of the medicament delivery device is moved relative to the proximal end.

The medicament delivery device may be an actual delivery device for injection of a medicament or may be a mock-up demo device for human factors study or for training.

According to another aspect, the system of the present disclosure can be a medicament delivery device coupled to the supplemental device and further includes a computer device that is external of the medicament delivery device and supplemental device, for example a mobile phone having a display device. The communication module could then be configured to transmit wirelessly and/or wired real time data from the logging module to the computer device external of the medicament delivery device and/or to a remote location for later analysis. The communication module may also be configured to transmit wirelessly and/or wired data stored in a memory module from the logging module to the computer device external of the medicament delivery device or to a remote location for later analysis.

The protective cap or cover portion of the medicament delivery device is configured and adapted to cover the dose delivery outlet e.g. when mounted on the medicament delivery device or when fixed to the medicament container. In the case where the medicament delivery device is a pen-type injector, it is preferable if the cap has a generally oblong cavity that is configured to receive the oblong portion of the proximal portion of the injector. The length of the blocking element, e.g., the insulting sheet or strip, is directly proportional and related to the degree of attachment of the cap with the proximal portion of the device housing. Likewise, the distance from the cap to the mounted supplemental device as compared to the length of the of the insulating strip dictates how much axial cap movement in the proximal direction is allowed (permissible) before the strip is removed from between the contacts causing activation of the supplemental device. In some circumstances it may be necessary or desirable to allow a small amount of relative axial movement between the cap and the terminal end of the proximal portion of the medicament delivery device housing. However, in the case of a medicament delivery device that relies upon sterility of the dose delivery outlet, then very little cap movement is tolerated before the supplemental device is activated. This is especially the case when the dose delivery outlet is an injection needle having its own separate flexible needle shield that is axially fixed to the protective cap. In other words, axial movement of the cap away from the device housing can result in axial movement of the needle shield away from the proximal end of the needle which can destroy the condition of sterility.

For the above reasons it may be desirable for the supplemental device to include a recorder component as part of or in addition to a sensor component that collects data relating to relative axial cap movement. Stated differently, activation of the supplemental device could then be correlated directly to cap movement or complete removal. In such a design, the activated supplemental device can be programed to send a signal through its communication component to an external device providing notice that relative cap movement has occurred. This notification could be programed to be automatic immediately upon the removal of the insulating strip and activation of the supplemental device.

Manipulation of the length of the blocking element and/or the placement of the supplemental device on the proximal end of housing can allow for activation to occur based on a predetermined cap separation from the terminal end of the housing. For example, the length of the insulating strip and/or placement of the supplemental device on the housing can be chosen such that activation of the supplemental device will only occur if the cap is completely removed from the medicament delivery device housing. A control component in the supplemental device can be adapted to detect such a predetermined event pattern and to provide notification to an external device that the event has occurred. The control component can also create a time log representing the detected event as a function of time.

The battery that can be used in the activation system of the present disclosure is preferably a button battery, sometimes referred to as a coin or watch battery. Such a battery can be single use and disposable or can be rechargeable. Preferably, the battery should have a shelf or non-use life of at least several years, most preferably at least 4 years. Further, once activated, the battery should be able to supply power that yields a run time of approximately 30 days and no shorter than 3 weeks. A battery cover can be provided that allows user access to the battery while the supplemental device is attached to the medicament delivery device housing.

The system of the present disclosure can communicate through a communication component or module in the supplemental device with an external device, for example, a computer or handheld personal digital assistant (PDA), such as a smart phone, tablet, or the like. The data transmission by the communication module can start immediately after the communication module or the recorder receives power from the battery, which occurs upon removal of the sheet of material from the supplemental device. This data transmission to the external device can occur wirelessly or through a wired connection. In the above system transmission of data between a medicament delivery device and the data collecting device may take place by wireless means, e.g. RF, IR, capacitive or inductive. Transmission of data may take place automatically when the data collecting device and a medicament delivery device are in the proximity of each other, e.g. within a given range.

The electronic circuitry may be adapted to perform one or more functions selected from the group consisting of the members: generating data representing the size of a dose set by the medicament expelling mechanism, generating data representing the size of a dose expelled by the medicament expelling mechanism, generating and storing a time log for data representing sizes of doses set by the medicament expelling mechanism, generating and storing a time log for data representing sizes of doses expelled by the medicament expelling mechanism, transmitting data to an external receiver, receiving data from an external transmitter, controlling a display adapted to display user-readable information, controlling indication means adapted to indicate when the secondary power source need to be recharged, and controlling control means adapted to prevent a dose to be set or expelled when the secondary power source need to be recharged.

The external or data collecting device may be in the form of one of the following devices: a BGM, a CGM, a medicament delivery device, a mechanically controlled medicament delivery device, an electronically controlled medicament delivery device, a PDA, a mobile phone, a key ring device, a credit card sized device, a medical hub, router, necklace, smart watch, or disposable monitoring units.

In another embodiment of the present disclosure a method of activating a supplemental device is presented where transmitting data containing information relating to a medicament delivery device occurs when a protective a cap or other cover that is attached to a proximal portion of the medicament delivery device is moved axially relative to the proximal portion of the medicament delivery device housing or is completely removed from the medicament delivery device housing. This method involves the removal of a blocking element, e.g., an insulating sheet or strip, from electrical contacts that are directly contacted to a battery that is part of an electrical circuit of the supplemental device than can contain a switch that is operatively connected to the battery and to a contact pad, where a part of the switch is directly connected to the cap. A recorder can be configured to obtain and store information about the medicament delivery device and a communication module can be used to transmit data recorder by the recorder to an external device.

The switch is initially in a first state where the battery module is prevented to/does not receive power from the battery and where movement of the cap proximally relative to the housing changes the switch to a second state where the battery provides power to the battery module, and if included therein, to a communication module. The power from the battery energizes the battery module so that it can accept information about the medicament delivery device. In some cases that information or data is recorded in a recorder and then further transmitted to an external device by a communication module. The supplemental device can also have a feedback signal that triggers when the battery module is activated. The feedback can be an audible and/or tactile signal. The electric circuit, the energy source (battery), a switch, a speaker unit and/or a piezoelectric unit, could all be used for generating the feedback signal. Further, according to another aspect of the present disclosure, the supplemental device could be a control unit, having a clock function. Another aspect could involve the control unit measuring the duration of a simulated dose delivery and comparing it with a predetermined time value and controlling the feedback signal to indicate to the user the occurrence of a correct simulated dose delivery or a failed simulated dose delivery. To further improve the quality of the feedback given to the user, the electronic circuit may be arranged to not only indicate the start of needle penetration and/or dose delivery but may also indicate to the user the time needed to press the training device against the training injection site.

The supplemental device may also comprise an antenna operably connected to said communication module and to memory storage elements that contains unique identification data relating to the medicament delivery device.

Thus, one of the main ideas of the present disclosure is that the supplemental device is inactive before activation. Depending on the type of technology used, inactive may mean that the circuit is not switched on at all until the battery provides power to the circuitry. Although a conventional coin battery has been described, it within the scope of the present disclosure that the power or energy source to activate the supplemental device may be derived from less conventional sources, such as, a photovoltaic panel or the like.

According to another favourable solution, the supplemental device may be arranged in a flexible label attachable to a device. A label provides a number of advantages. It is easy to add functionality from the information transmitter to a device by attaching it to an exterior surface of the device. With this solution the supplemental device can be easily added to the outside surface of an existing medicament delivery device housing. As such, the supplemental device does not have to be built into the medicament delivery device. Further a label may be rather thin and does not add any substantial volume to a device when attached. An information transmitter as a label may further be arranged with additional information or indicia readable by a user, such as letters and numbers, or by scanning devices such as QR-codes or EAN-barcodes.

Further, the flexible label may be arranged with the above described blocking element, e.g., an insulating strip, and be more readily attached to the protective cap or other covering component of the medicament delivery device. The blocking element could be incorporated into a portion of the label extends over the point of attachment of the cap with the terminal proximal end of the medicament delivery device. With such a solution the electronic circuit may be activated when a part of the label is torn away or otherwise removed by a user, which provides an intuitive activation operation.

As mentioned, a device that really may benefit from utilizing an attached supplemental device, and in particular in the form of a label is a medicament delivery device, especially for self-administration. A label containing the supplemental device may then be attached to an outer surface of an existing well-known medicament delivery device, without the need to redesign or make modifications to the existing medicament delivery device. In that respect, the flexible label may be attached to said medicament delivery device such that the tear line incorporating the blocking element is positioned between a housing part and a part that is detached prior to use. As stated, this may for instance be a protective cap that usually is removed before use. Again, it is an intuitive step to remove the protective cap, thereby tearing away a part of the label and with it the blocking element such that the electronics circuit of the supplemental device is activated by electrically connecting the power unit, e.g., the battery, to the electronics circuit.

Regarding usable technologies, the electronics circuit of the supplemental device may comprise Bluetooth technology, which has a few advantages. A Bluetooth transmitter may communicate with a smart device, which may not have to be at such a close range as e.g. NFC-technologies. Most smart devices nowadays are arranged with Bluetooth communication circuits, which this facilitates the transmission of information from the information transmitter to the smart device. A further advantage with Bluetooth is the possibility that an information transmitter of a medicament delivery device provided to a certain user is bonded to a smart device of said certain user. There is thus a tight connection between the medicament delivery devices that a user receives and is to use and their personal smart devices. Thus, information from specific medicament delivery devices are only transmitted to specific smart devices.

These and other aspects of, and advantages with, the present disclosure will become apparent from the following detailed description of the present disclosure and from the accompanying drawings.

BRIEF DESCRIPTION OF DRAWINGS

In the following detailed description of the present disclosure, reference will be made to the accompanying drawings, of which FIG. 1 schematically illustrates a general circuit diagram according to the present disclosure, where the medicament delivery device is not shown for clarity.

DETAILED DESCRIPTION

In the following description, the wording smart devices will be used. In this context, smart devices may include electronic devices that are provided with processors that are capable of running computer programs as well as storage space to store programs as well as data retrieved from different external sources. It is further to be understood that the smart devices are provided with communication systems that are capable of communicating with data networks in order to access different databases. It is to be understood that databases may be accessed via the internet, so called cloud services, and/or databases that are connected directly to and accessed via local area networks. It is further to be understood that the smart devices in this context comprise some sort of human-machine interface for two-way communication. The human-machine interface may comprise displays, keyboards, microphones, loudspeakers, I/O-ports for connection of peripherals. Further the smart devices may be provided with antennas for wireless communication with the networks. Also, the smart devices may be arranged with receiving and transmitting mechanisms capable of communicating with NFC tags as well as programs capable of establishing and handling the communication with the NFC tags.

Further, in the following description, the wording medicament delivery device will be used. In this context, medicament delivery devices may include a number of devices capable of delivering certain doses of medicament to a user, such as e.g. injection devices with or without injection needles, inhalers of all kinds, such as powder, aerosol driven, gas, nebulizers having mouth or nasal pieces, dispensers for medicament in tablet form. The medicament delivery devices may be of either disposable type or reusable type and may be provided with medicament containers suitably arranged for specific medicaments in specific forms.

Figure 1:
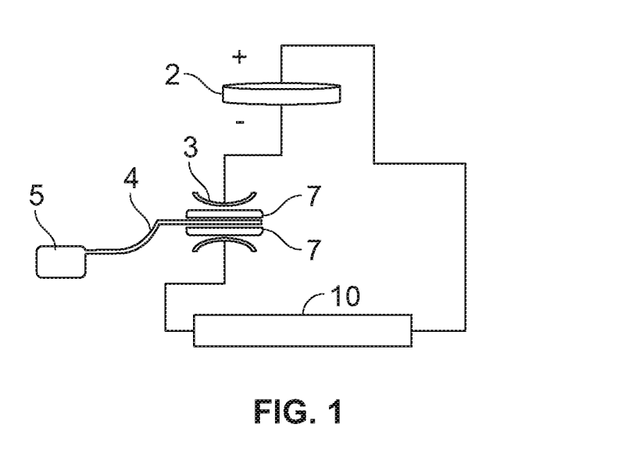
Figure 2:
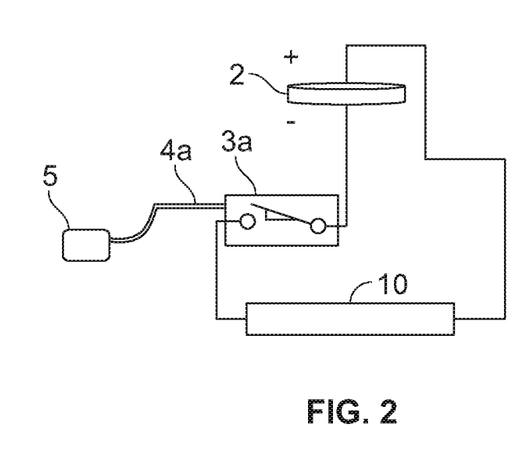
FIG. 2 schematically illustrates another general circuit diagram that uses a normally closed switch according to the present disclosure, where the medicament delivery device again is not shown for clarity
Figure 3:
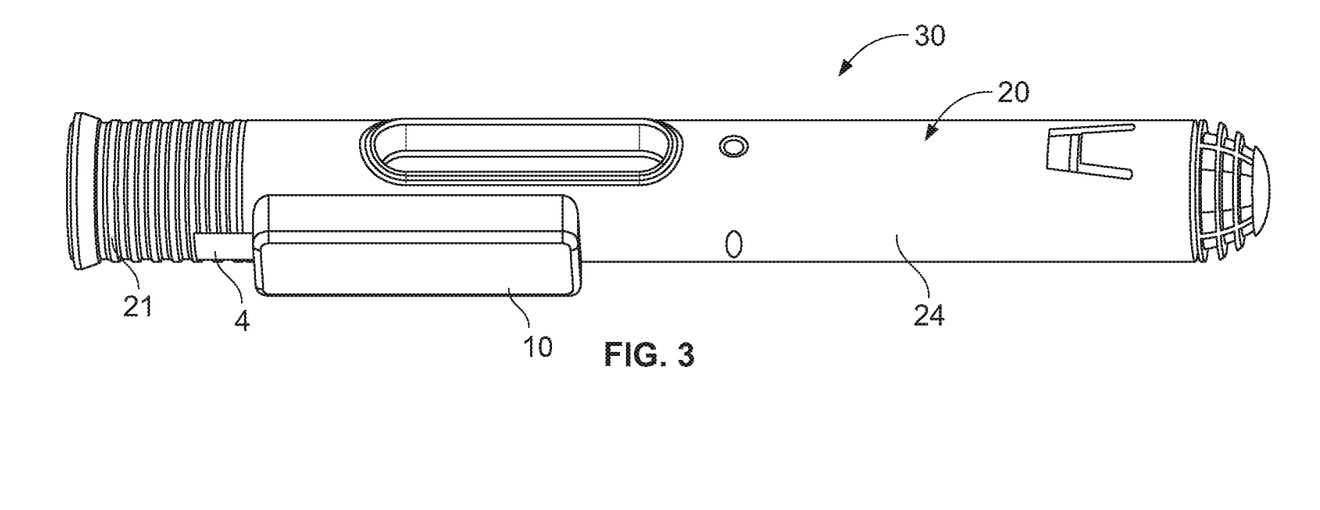
FIG. 3 is a schematic representation of one possible embodiment of the present disclosure where the supplemental device is a single disposable unit that is attached to an injection device.

Turning first to FIG. 1, there is schematically shown the basic circuit diagram of the supplemental device 10 that can be used in the present activation system. An energy source 2, shown as a coin battery, is electrically connected to a battery module. This battery module may contain, one or more sensors/sensor module as described above, a communication module for transmitting data to an external device, a recorder or memory module, and a controller (control unit). The sensors may include, a magnetometer, a gyroscope, and/or an accelerometer. A magnetometer may be used to detect the position of an auto injector needle of the medicament delivery device having attached the supplemental device 10. A gyroscope may be used to detect the position of the medicament delivery device and the accelerometer may be used to detect movement in a particular direction. By use of a combination of a gyroscope and three accelerometers, a high precision tracking may be provided. The supplemental device 10 of FIG. 1 also contains an energy isolation feature comprising a switch mechanism that includes a biasing element 3, a contact pad 7 and a blocking element 4, for example, an insulating sheet. FIG. 2 illustrates another possible switch mechanism that uses a normally closed mechanical switch 3a that is mechanically held open until the cap is removed which then causes the switch to close and completes the circuit. A proximal end of blocking element 4 may contain an attachment feature 5 for direct connection to the cap or covering of a medicament delivery device, for example the injection device illustrated in FIGS. 3 and 4. Although the supplemental device 10 is shown attached to a proximal end of the outer housing 24 of the medicament delivery device, the supplemental device 10 can be attached anywhere along the length of the outer housing 24.

The memory module, when present, can be a non-volatile memory to store data from the sensor(s)/sensor module and/or from a logging module. The non-volatile memory may e.g. be a read-only memory, flash memory, ferroelectric RAM (F-RAM), most types of magnetic computer storage devices (e.g. hard disks, floppy disks, and magnetic tape), optical discs. The non-volatile memory may be removable, to be inserted into a reader of an external device. The supplemental device 10 may further be provided with a contact interface, allowing stored data to be uploaded to an external device through a cable connection. The communication module when present allows real data and/or stored data to be uploaded to the external device. The communication module is configured to wirelessly and/or wired transmit real time data from the logging module or to transmit stored data from the memory module. The communication module may be provided with e.g. wi-fi, Bluetooth or BLE.

As illustrated in FIGS. 1, the blocking element, herein after referred to as just one example, that being an insulating sheet 4, is positioned between contact pads 7 such that no electricity flows from one contact to the other, i.e., an open circuit exists and the energy source is prevented to/cannot activate or energize the battery module. The biasing elements 3 act to keep the insulating sheet 4 in place between the contacts by exerting a compression force that biases the contacts towards each other. Removal of the insulating sheet 4 will result in the contact coming to tighter and closing the circuit, thus allowing the energy source to provide power to the battery module. In some instances, such as shown in FIG. 4, one of the contacts is a portion of the battery itself and depending on the design only a single biasing element is needed.

Referring to FIGS. 3-6 represents a possible configuration 30 where the battery module is attached to the outer housing 24 of a medicament delivery device 20 having a protective cap 21 and containing a medicament container 65 having a dose delivery outlet 60 i.e. a fixed needle that is covered by needle shield 62. Attached to protective cap 21 is needle shield remover 61, where the removal of the cap 21 from housing 24 necessarily causes removal of the needle shield 62 from needle. Attached to the cap 21 is part of the blocking element made up of tether 4 which can be comprised of an insulating material such that a portion of the tether is located between the biasing element 3 and battery 2.

In some instances, it is desirable that the protective cap be removed first from the device housing before the tether 4 is removed from the electrical circuit. This allows the user removing the cap to first overcome the securing forces holding the protective cap in place before having to also overcome the holding forces that hold the tether in place. As such, the length of the tether can be designed and configured so that the protective cap is fully removed from the device, i.e., reducing the cap holding force to zero, before the user applies a counter force to the tether that will eventual overcome the holding force on the tether that is a result of the electronic switch component of the battery module. Accordingly, the length of the tether can be predetermined and configured to 1) achieve a desired timing of battery activation and/or 2) to control the removal forces experienced by a user as the cap and tether are both removed from the medicament delivery device and battery module, respectively.

Figure 4:
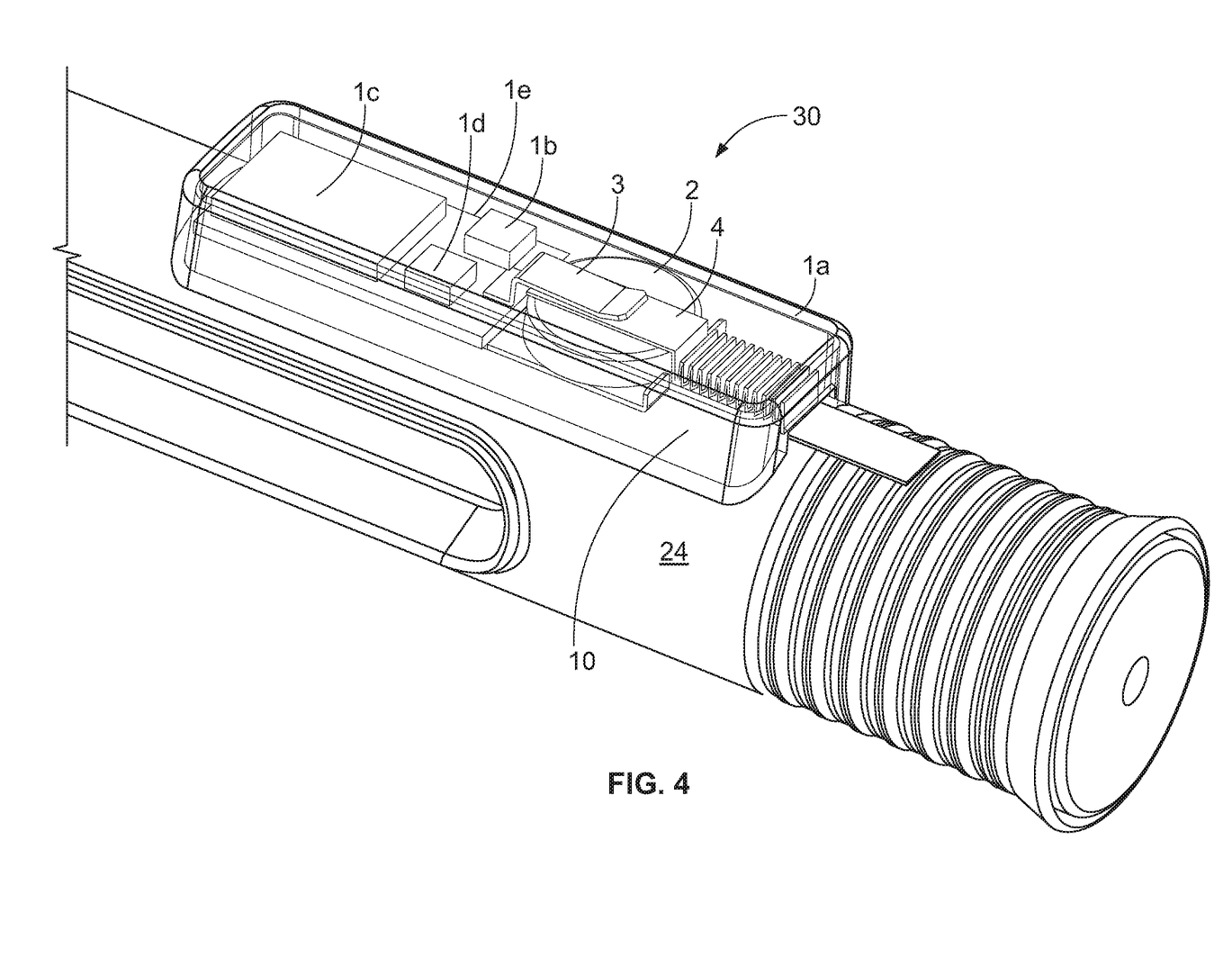
FIG. 4 illustrates the embodiment of FIG. 3, where the individual components of the supplemental device are visible.
Figure 5:
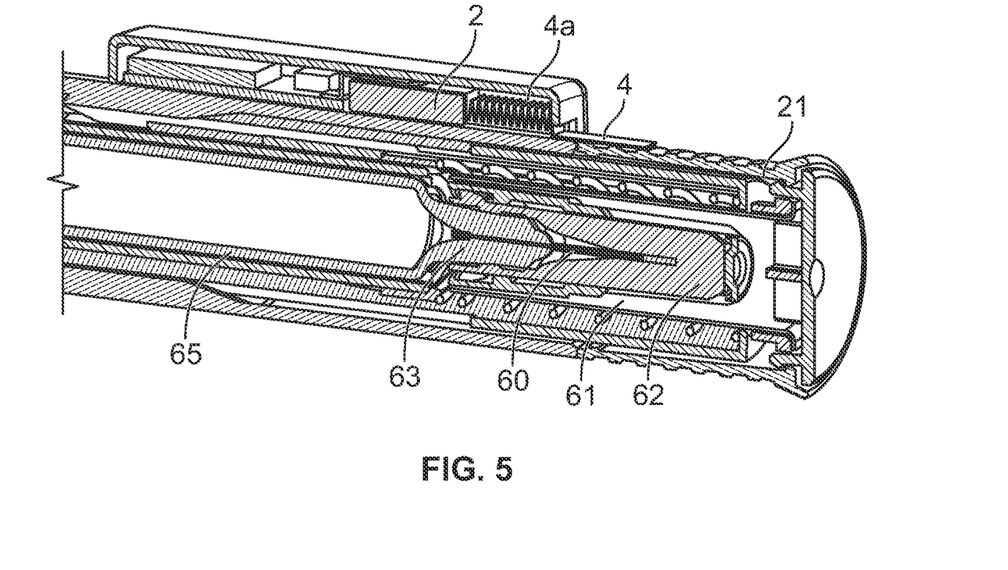
FIG. 5 is a partial cross-section view of the embodiment of FIG. 3 where the blocking element has a tether that is in a folded or accordion configuration within the battery module.
Figure 6:
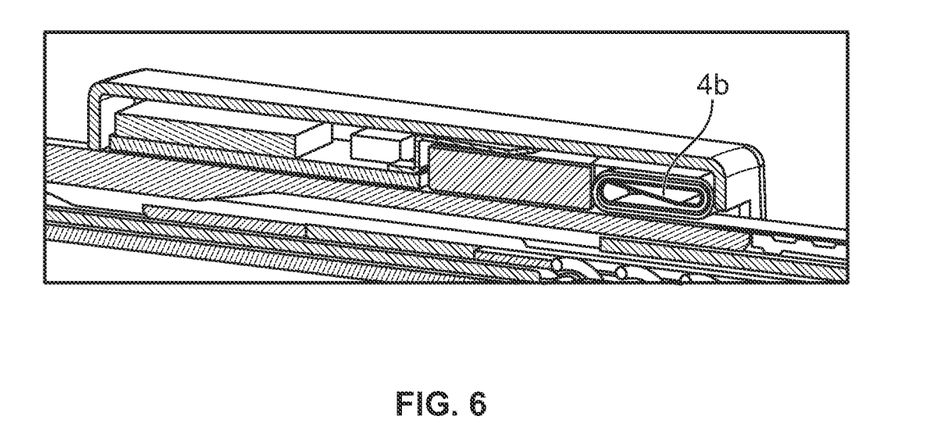
FIG. 6 is a partial cross-section view of another embodiment where the blocking element has a tether that is in a wrapped configuration within the battery module.
Figure 7:
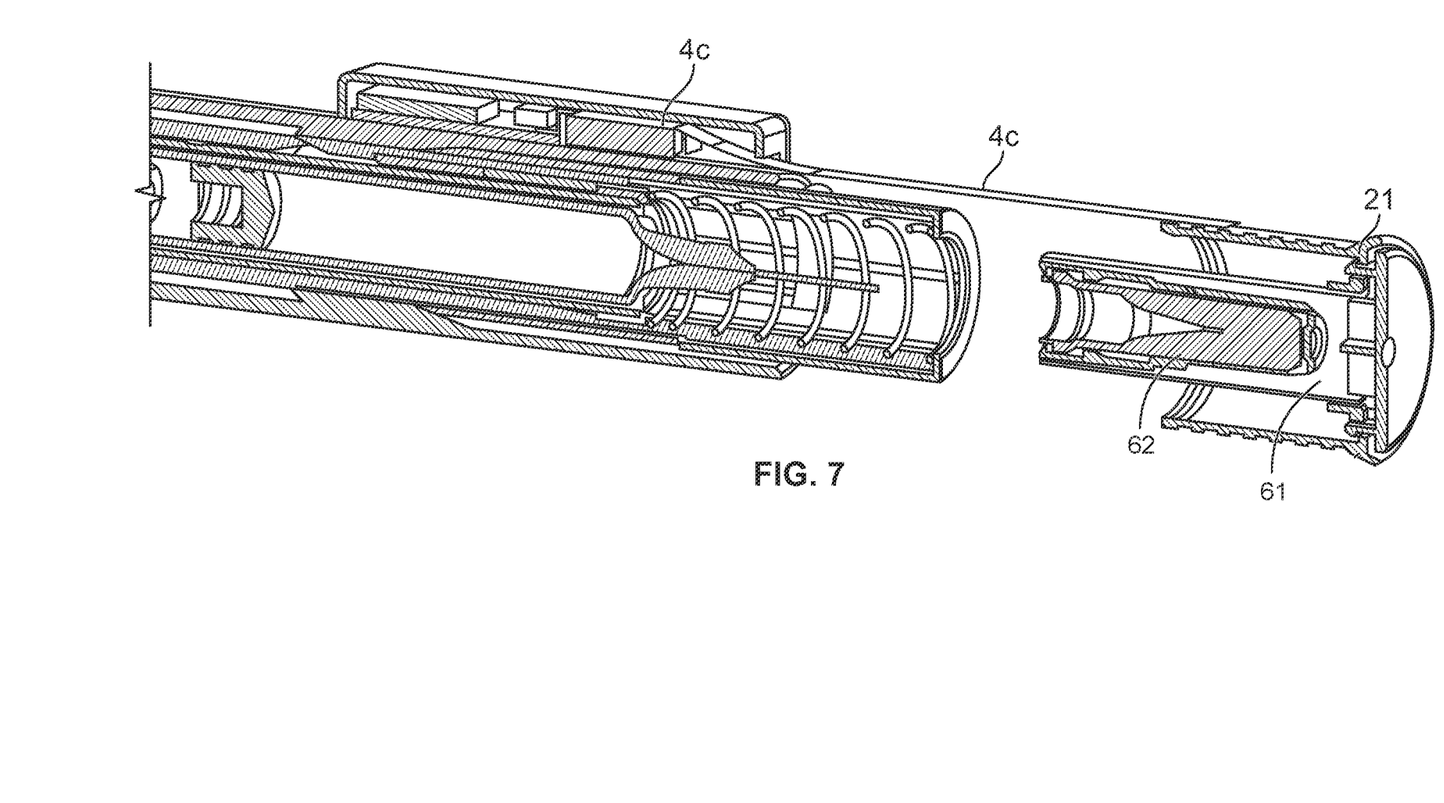
FIG. 7 is a partial cross-section view of the embodiment of either FIG. 3 or FIG. 5 where the tether has been extended and the protective cap/needle cover is removed, but the blocking element is still connected to the battery module.

As shown in FIGS. 4 and 5, when it is desired to have a predetermined length of the tether 4 so that the protective cap can be removed first, the excess length of the tether needed represents a portion of the tether that can be stored inside the battery module in a folded or accordion configuration 4a. Alternative, as illustrated in FIG. 6 the tether could be stored in a wrapped configuration 4b. FIG. 7 shows the situation where the tether is designed with a length such that when in an extended configuration 4c the protective cap 21, needle shield remover 61, and needle shield 62 have been completely removed from needle hub 63, yet the blocking element is still in place isolating the battery from the circuit. Further movement of cap 21 away from housing 24 will cause the blocking element to be removed from the battery module, thus closing the electrical circuit and allowing the battery to energize the battery module.

FIG. 4 also shows an embodiment where the battery module includes a number of electrical components such as a communication module 1b, a recorder 1d having data storage, and a processor or control unit 1c. All of these components/modules are in electrical communication through circuit board 1e and enclosed by cover 1a.

The communication module 1b of the battery module contained in the supplemental device 10 of the present disclosure may also make use of radio frequency identification technology, RFID. In particular, high frequency RFID provides a number of advantages regarding communication. The possibilities of using HF RFID are numerous and in particular provides the use of Near Field Communication, NFC. NFC is particularly suitable because it is a set of standards for smartphones and the like smart devices to establish radio communication. NFC is a set of short-range wireless technologies, typically requiring a distance of 10 cm or less. NFC operates at 13.56 MHz on ISO/IEC 18000-3 air interface and at rates ranging from 106 kbit/s to 424 kbit/s. NFC always involves an initiator and a target; the initiator actively generates an RF field that can power a passive target. This enables NFC targets to take very simple form factors such as tags, stickers, key fobs, or cards that do not require batteries.

In the following description of the technology used the word NFC-tag may be used. In this context it is to be understood that NFC-tag will comprise an NFC-chip connected to a circuit as well as an antenna. NFC-tag is not limited to be integrated in a patch or label, but may be a stand-alone unit, or integrated in the material used for manufacturing medicament delivery devices. Further, the NFC-tag may include further features and components that are needed for the required or desired purposes and applications as will be apparent below.

NFC tags contain data and are typically read-only but may be rewriteable. They can be custom-encoded by their manufacturers or use the specifications provided by the NFC Forum, an industry association charged with promoting the technology and setting key standards. The tags can securely store personal data such as debit and credit card information, loyalty program data, PINs and networking contacts, among other information.

Regarding medicament delivery devices, they can be arranged with NFC tags in order to perform a number of tasks. The NFC tags may be arranged as part of the above-mentioned supplemental devices of the present disclosure and conveniently incorporated in labels which are attached to an outer surface of a housing of a medicament delivery device.

The types of short-range wireless technology (SRWT) that may be utilized in the supplemental devices include ANT+, RFID, Zigbee and Bluetooth. One favourable technology is then the Bluetooth-technology. Bluetooth technology operates in the unlicensed industrial, scientific and medical (ISM) band at 2.4 to 2.485 GHz, using a spread spectrum, frequency hopping, full-duplex signal at a nominal rate of 1600 hops/sec. The 2.4 GHz ISM band is available and unlicensed in most countries. Especially the Bluetooth low energy or Bluetooth Smart may be utilized in connection with medicament delivery devices and the functions that are requested. The Bluetooth circuit is provided with a transmitter that is capable of transmitting for instance a unique identification number or data as well as recording a time stamp. The Bluetooth circuit is preferably driven by the power source described above, e.g. the coin battery, wherein removal of the insulating strip acts a switch that is arranged between the battery and the Bluetooth circuit for activating the Bluetooth circuit only when there is an occurrence or change of status of the medicament delivery device.

Figure 8:
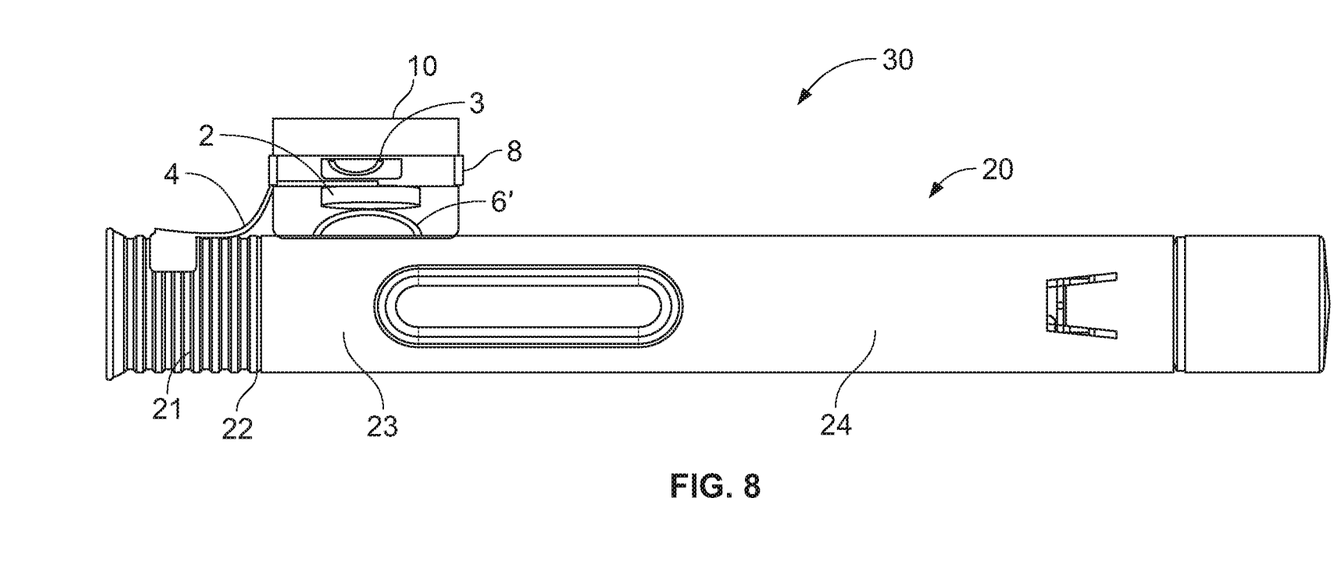
FIG. 8 is a schematic representation of another possible embodiment of the present disclosure where a portion of the supplemental device removable from a battery portion and is reusable.

FIG. 8 illustrates schematically one possible system 30 of the present disclosure where a medicament delivery device 20 has attached a supplemental device 10. The supplemental device 10 is attached via an adhesive to the outer surface of the proximal portion 23 of the medicament delivery device housing 24. The supplemental device 10 comprises a battery module, a battery compartment, an optional biasing member 3, a contact pad that is insulated from battery 2 by a distal or free end of insulating sheet 4. Insulting sheet 4 is secured, for example, through an adhesive at the proximal end 5 to the protective cap 21 of the medicament delivery device 20. Importantly, insulating sheet 4 spans the connection point 22 where the cap 21 attaches to the proximal end 23 of device 20. The protective cap 21 covers the dose delivery outlet 60, e.g., an injection needle accessible only through the terminal proximal end of housing 24.

Removal of cap 21 from housing 24 will carry insulating strip 4 with the cap and thus remove it from between the battery 2 and contact pad. This will then close the circuit allowing the battery to activate and energize the battery module.

In another possible embodiment of the presently disclosed activation system (see FIG. 3), the design of the supplemental device 10 is such that the battery module can be removed from the battery housing 6' and reused. The battery module maybe releasable attached to the battery housing 6' through connector 8, which might be a threaded connection, a snap fit connection, a weak adhesive connection or other releasable attachment feature.

Figure 9:
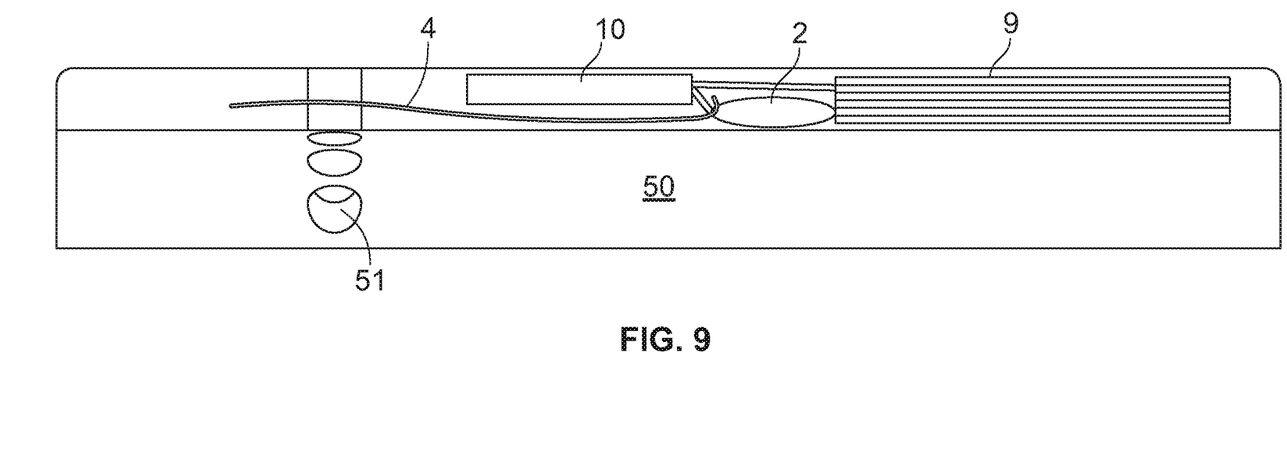
FIG. 9 shows the supplemental device of the present disclosure incorporated into a label for attachment to a medicament delivery device.

FIG. 9 presents yet another embodiment of the activation system of the present disclosure where the activation system is part of or incorporated into a label 50 designed to be affixed to the outer housing of a medicament delivery device, such as housing 24 of medicament delivery device 20. The label 50 can include a separate RFID tag and antenna combination 9 in addition to the battery module. An insulting sheet in the form a strip or tether 4 is imbedded in in a proximal end portion of the label 50 whereby battery 2 is electrically isolated from the circuit connecting battery module with the RFID tag and antenna combination 9. This electrical circuit element is designed in the label and a portion of the proximal end is positioned on the medicament delivery device such that it extends over a tear line 51 that generally follows the interface between a cap or other covering of the medicament delivery device that completely covers the dose delivery outlet of the medicament delivery device, e.g., the protective cap 21 and the housing 23. When the medicament delivery device is to be used, the protective cap is removed, which will cause the label 50 to be torn along the tear line 51, which in turn will cause the insulating tether 4 to also be removed and thus pulling the tether away from the label that remains affixed to the housing. This pulling away of the tether closes the circuit such that the battery can now provide power to the circuit.

Figure 10:
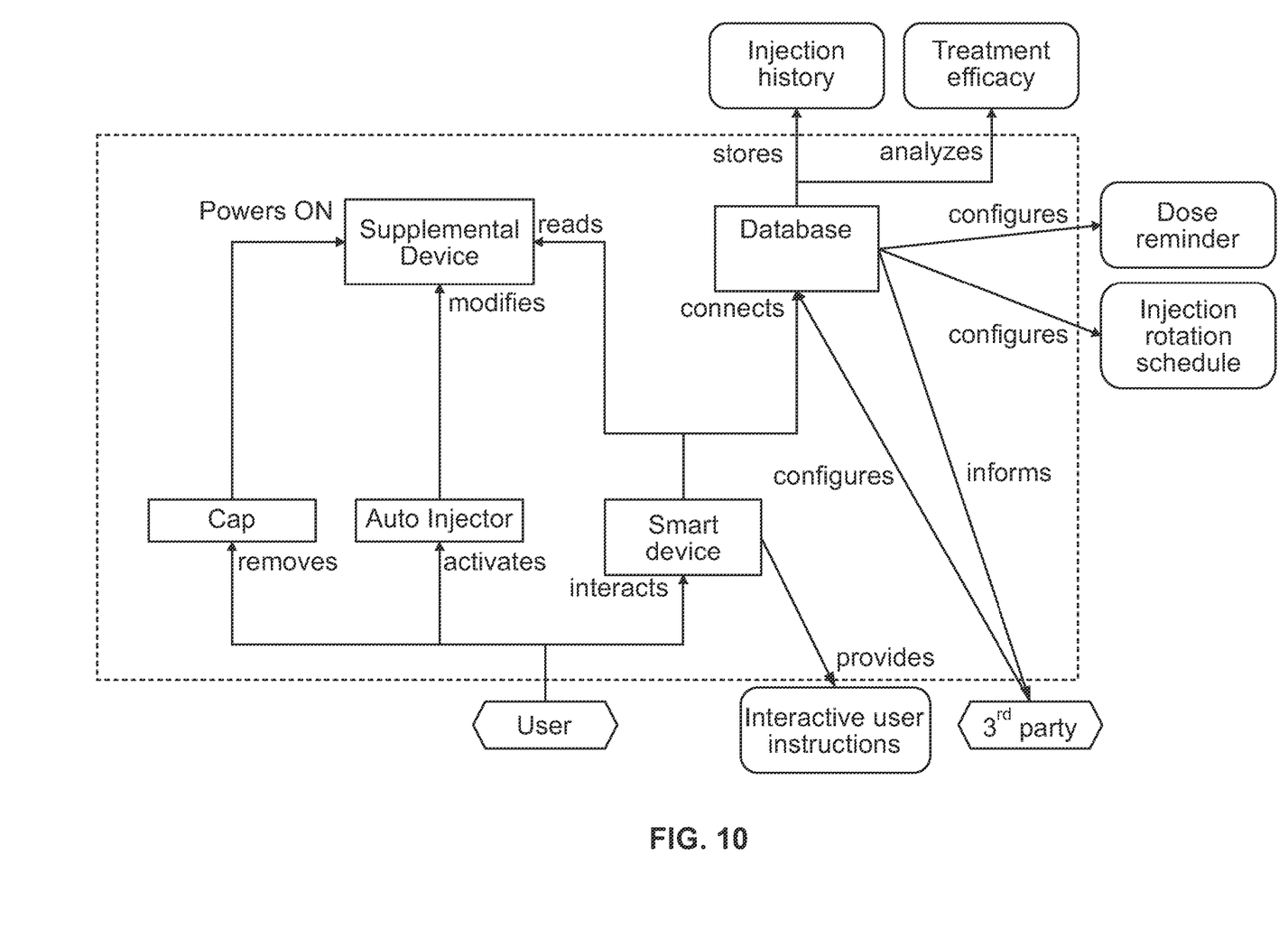
FIG. 10 displays a functional scenario according to the present disclosure where the supplemental device integrates with the user and external devices.

FIG. 10 illustrates one possible logical flow diagram representative of activation system of the present disclosure. Circuits may be connected to a number of modules or components within the supplemental device 10 for providing status information. Such status information may comprise end of dose delivery. It may for example be important for a user to know when an injection sequence has ended and that it is safe to remove the device from the injection site. In this case a circuit may be affected by moving components at the end of dose delivery, wherein the circuit acts as a switch. The switch information detected by the SRWT is transmitted to the smart device, wherein the smart device is arranged to indicate to the user that the device may safely be removed. Also, this information confirms that the device is used.

The circuits and switches may further be used as interactive, step by step, instructions. For example, the smart device may be provided with an instruction application showing a user in a step-wise manner how a device should be handled. When one step has been performed, whereby a certain circuit has been affected and detected by the SRWT and transmitted to the smart device, an OK or positive response is provided by the smart device and displayed to the user. The instruction application then shows the subsequent handling step to be taken. In this manner, all steps affect different circuits that in turn provide the SRWT-chip with status information. This status information is successively transmitted to the smart device and appropriate information is displayed to the user by the instruction application.

In connection with the increased integration of the medicament delivery device and the smart device through the use of the supplemental device (see FIG. 6), further information could be collected in order to increase the understanding of the effects of a certain treatment scheme, e.g. disease monitoring. The programs or applications that are used in the smart device in connection with the medicament delivery devices may further include questionnaires that are filled in by the user in connection with a dose delivery operation. The questionnaire may include a number of questions regarding the current status of the patient and may preferably be configurable depending on therapy, disease and user needs. The areas that might be handled may include quality of life, cognitive function, pain, fatigue, nausea, mental health, etc. The answers of the questionnaire may then be transmitted from the smart device to external databases together with information collected via the SWRT-tags for processing and evaluation to find positive or negative correlations between the treatment scheme and type of medicament in relation to the perceived condition of the patient.

Further, if the smart device is not equipped with an NFC-reader, the attachment could be provided with such an NFC-reader, thereby adding functionality to the smart device. The integration of the medicament delivery device and the smart device further provides real time interactive user instructions as well as correct injection times, dates and dose quantities because of the close connection between the medicament delivery device and the smart device because of real time reading of the NFC-tag. The injection times, dates and dose quantities can be recorded directly in the smart device for further processing or transmittal.

Many smart devices are arranged with motion sensors in three dimensions, which functionality could be used in connection with handling of the medicament delivery device. For instance, the smart device could detect how it, and thus the medicament delivery device, is being held. This may be important for some types of medicaments and for some types of medicament delivery devices in that the medicament delivery device has to be held in a certain way during some steps when used. This could for example be a medicament delivery device using a so-called dual chamber medicament container, where it can be important how the medicament container is held during mixing and priming. The motion sensors of the smart device could then be used to detect how the medicament delivery device is held and could inform a user on how to hold the device and alert the user if the device is not held according to instructions.

Further features of the smart device that could be used with the integrated medicament delivery device include the use of a camera that is often an integrated part of the smart device. The camera could then be used to take photographs of the content of the medicament container, which often is transparent, in order to obtain information regarding the status of the medicament. For example, colouring or opacity of a medicament may indicate that something adverse has happened to the medicament, such as exposure to temperatures outside the prescribed range, such that the medicament should not be used. The comparison of colour or opacity may be performed directly by the user in an application in the smart device, or the picture may be sent by the smart device to an external site where skilled personnel perform the comparison and alert the patient of any deficiencies of the medicament and advice as to how proceed.

Regarding adherence and patient responsibility, there are features and functions of the smart device that may be utilized. Some medicaments and treatment schemes are very expensive to the national healthcare authorities and a lot of responsibility is put on the users to really adhere to the treatment schemes. There has been discussions in several countries in the world that if patients do not adhere to an expensive treatment, they should be forced to pay for the continued treatment, fully or partly, the arguments being that those persons that are not interested enough in a treatment should have to pay for it. The information and medicament delivery history obtained from the NFC-tags could be used to monitor the adherence.

The invention claimed is:

1. A system for activating a supplemental device attached to a medicament delivery device, the system comprising:
    a medicament delivery device comprising:
        a housing;
        a medicament container positioned within the housing; and
        a dose delivery outlet accessible through a terminal end of the housing,
    a removable cap attached to the housing such that the dose delivery outlet is prevented from being accessible unless the cap is fully removed from the medicament delivery device;
    a supplemental device comprising:
        a battery module attached to the housing or to the cap, wherein the battery module comprises: a battery; a contact pad; and a switch operatively connected to the battery and the contact pad, wherein a part of the switch is directly connected to the cap when the battery module is attached to the housing or where a part of the switch is directly connected to the housing when the battery module is attached to the cap; and
        a communication module connectable to the battery module or included as part of the battery module, and configured to transmit data to an external device, wherein the data comprises information directly related to a status of the switch, wherein the switch is initially in a first state where the communication module is prevented to receive power from the battery and where movement of the cap relative to the housing changes the switch to a second state where the battery provides power to the communication module,
        wherein the switch further comprises a biasing component that exerts a force that biases the contact pad towards a contact surface operatively associated with the battery, and a strip of material operatively connected with the battery or contact pad, and wherein the strip of material is configured to allow the cap to be separated first from the housing before being removed from the battery module.

2. The system of claim 1, wherein the switch is configured to be in the first state only once.

3. The system of claim 1, wherein the switch is prevented to transform from the second state back to the first state.

4. The system of claim 1, wherein removal of the strip of material from the battery module starts the data transmission by the communication module.

5. The system of claim 4, wherein the strip of material comprises insulating material such that the strip prevents electricity conduction.

6. The system of claim 5, wherein the part of the switch comprises the strip material and is connected to an outside or inside surface of the cap or of the housing.

7. The system of claim 1, wherein the attachment of the battery module and of the communication module are permanent such that the housing and the battery module are disposable and are prevented to be separated from each other without destroying the housing or the modules.

8. The system of claim 1, wherein the battery module or the communication module comprises one or more sensors configured to detect a motion of at least one of the components of the medicament delivery device.

9. The system of claim 1, wherein the system further comprises a sensor module connectable to any other module and wherein said sensor module comprises one or more sensors configured to detect a motion of at least one of the components of the medicament delivery device.

10. The system of claim 9, wherein any of the modules is removable from the housing and is reusable.

11. The system according to claim 1, wherein the battery module or the communication module comprises a recorder configured to obtain and store data information about the medicament delivery device.

12. The system of claim 11, wherein the data transmission by the communication module starts when the recorder receives power from the battery.

13. The system of claim 1, wherein the system further comprises a logging module connectable to any other module or included as part of any other module, and wherein the logging module is configured to start tracking motion of the medicament delivery device when the cap is removed.

14. The system of claim 1, wherein the system further comprises a memory module connectable to any other module or included as part of any other module, and wherein the memory module is configured to store the data and the communication module is configured to transmit the data wirelessly to the external device.

15. A system comprising a supplemental device attached to a medicament delivery device, wherein the medicament delivery device comprises:

a housing having a proximal end and a distal end; and
a removable cap attached to the proximal end of the housing that prevents user access to an outlet of a medicament container when positioned within the housing unless the cap is fully removed from the medicament delivery device, and wherein the supplemental device comprises:
a battery module attached to the housing or to the cap, where the battery module comprises:
a battery;
a contact pad;
a switch operatively connected to the battery and the contact pad, where a part of the switch is directly connected to the cap when the battery module is attached to the housing or where a part of the switch is directly connected to the housing when the battery module is attached to the cap; and
a communication module connectable to the battery module or included as part of the battery module, and configured to transmit data to an external device, where the data comprises information directly related to a status of the switch, wherein the switch is initially in a first state where the communication module is prevented to receive power from the battery and where movement of the cap relative to the housing changes the switch to a second state where the battery provides power to the communication module, wherein the switch is prevented from transforming from the second state back to the first state, and wherein the switch includes a strip of material operatively connected with the switch, the strip of material being configured to allow the cap to be separated first from the housing before being removed from the battery module.

16. The system of claim 15, wherein removal of the cap from the housing causes movement of the strip of material which electrically connects the battery to the communication module.

17. The system of claim 16, wherein the strip of material comprises an insulating material that prevents electricity conduction between the contact pad and the battery.

18. The system of claim 16, wherein the part of the switch comprises the strip material and is connected to an outside or inside surface of the cap or of the housing.

19. The system of claim 16, wherein the switch further comprises a biasing component that exerts a force that biases the contact pad towards a contact surface operatively associated with the battery.

* * * * *